United States Patent Office 3,007,891
Patented Nov. 7, 1961

3,007,891
PIGMENTED POLYETHYLENE TEREPHTHALATES AND PROCESS FOR PREPARING THEM
Helmut Gerstenberg and Karl Heinrich Grunewald, Frankfurt am Main, and Heinz Medem, Offenbach (Main), and Rudolf Lademann, Frankfurt am Main, Germany, assignors to Farbwerke Hoechst Aktiengesellschaft vormals Meister Lucius & Bruning, Frankfurt am Main, Germany, a corporation of Germany
No Drawing. Filed Dec. 23, 1958, Ser. No. 782,368
Claims priority, application Germany Dec. 27, 1957
18 Claims. (Cl. 260—40)

The present invention relates to the manufacture of polyesters and particularly of polyethylene terephthalate, containing pigments in suitable distribution and in such grain sizes as to render said polyesters suitable for the manufacture of colored structures, such as foils, and especially for the manufacture of spun-dyed structures as fibers, filaments, ribbons and twists.

It is known to prepare pigmented polyethylene terephthalate by adding the pigment to the glycol used in the manufacture of the polyester before polycondensing the glycol with acid. The polyester formed is then further processed in known manner.

Considerable difficulties are encountered, however, if very thin, pigmented filaments, fibers and the like are to be manufactured from the polyesters. Satisfactory results are obtained only if the pigments used do not contain any coarse particles. A great many of the commercial pigments, particularly the carbon black which is especially suitable for black pigmentation, contain, besides very small particles constituting the major part of the pigment, still coarser particles the size of which attains or exceeds $30\mu$, whereas the maximum particle size of 3 up to at most $5\mu$ should not be surpassed in the manufacture of fine structures. Moreover, the major part of pigments has to be essentially smaller ($0.1-0.3\mu$). Furthermore, when mixing glycol with larger quantities of such pigments comprising particles unequal in size, the pigments are not dispersed finely enough so that the pigments, though they are present in a fine distribution, accumulate to form agglomerations. These agglomerations, on the one hand, can raise difficulties during the later spinning process of the polyester, and on the other hand, considerably reduce the depth of shade and finally, cause the viscosity of the glycol-pigment-dispersion to increase considerably. This applies especially to carbon black which, as is known, is very voluminous and has to be admixed in particularly large quantities, in order to obtain full black shades, quantities which may amount, for example, to 2–6%, referred to the weight of the polyester, or 4–12%, referred to the weight of the glycol. Dispersions of carbon black present in such high concentrations in glycol are very viscous. They may even reach the form of a paste.

This high viscosity, however, renders it difficult to evenly admix the dispersion to the reaction mixture in the manufacture of the polyester. In addition thereto, the high viscosity hinders the use of simple processes as, for example, sedimentation or centrifugation for the elimination of compact coarse particles. For this reason, it has not been possible up to now to produce spun-dyed filaments or fibers of polyethylene terephthalate on a large scale either in colored or in black shades.

Now we have found that finely dispersed pigment-glycol dispersions suitable for reaction to form linear polyesters are obtained, if the dispersions are prepared using condensation products of aromatic hydroxy compounds or their precondensates with low molecular weight aliphatic aldehydes and aromatic ω-sulfomethane compounds prepared in an alkaline medium and/or from condensation products of naphthalene sulfo acids with formaldehyde as dispersing agent, as described, for example, in the German patent specifications 426,424 and 292,531. German Patent 426,424 describes the preparation of condensation products from aromatic hydroxy compounds or their precondensates with low molecular weight aliphatic aldehydes and aromatic ω-sulfomethane compounds. German Patent 292,531 relates to the preparation of condensation products from sulfo acids of naphthalene with formaldehyde. As suitable aromatic hydroxy compounds there may be mentioned by way of example: phenols, cresols, naphthols, xylenols, dihydroxy-diphenyl compounds or their sulfo acids. As ω-sulfomethane compounds there enter into consideration those of phenols, naphthols, of aminobenzoyl sulfo acids, of amino-naphthalene-sulfo acids and of hydroxynaphthalene-sulfo acids. The condensation products according to German Patent 426,424 are preferably used. According to Example 1 of said patent, 120 parts by weight of the sodium salt of 1-(ω-sulfomethyl)-2-hydroxy-6-sulfonic acid are reacted with 36 parts of the resinous condensation product of phenol and formaldehyde by heating in 300 parts of water containing 38 parts of NaOH for 6 hours at temperatures above 100° C. (about 120°–150° C.) to give a water soluble product.

According to Example 2 of the patent, a condensation product of sodium p-phenol sulfonate and the sodium salt of 1-hydroxy-benzene-2-(ω-methyl sulfonic acid) is prepared in analogous fashion.

Examples 3–7 of the patent describe the preparation of condensation products of the following materials, respectively:

Example 3, the sodium salt of 1-(ω-sulfomethyl)-2-hydroxy-naphthalene-3-carbonic acid, cresol, and paraldehyde;

Example 4, the sodium salt of 2-hydroxy-naphthalene-1-(ω-methylsulfonic acid) with m-cresol and formaldehyde;

Example 5, the sodium salt of 1-(ω-sulfomethyl)-2-hydroxy-naphthalene-6-sulfonic acid with p,p'-dihydroxy-diphenyl sulfone;

Example 6, the sodium salt of ω-sulfomethyl-anthranilic acid, cresol, and acetaldehyde or paraldehyde;

Example 7, the sodium salt of the ω-sulfomethyl compound obtained by treating the sodium salt of 1-amino-naphthalene-4-sulfonic acid with sodium bisulfite and formaldehyde, with phenol and acetaldehyde.

It is surprising that the mentioned condensation products even when added to the glycol in quantities of 0.05 to 5% by weight, preferably 0.05 to 0.7% by weight, cause the organic or inorganic pigments, in particular the carbon black, to disperse finely in the glycol without forming agglomerations. A special advantage is, furthermore, that the viscosity of these dispersions is decreased to a fraction of the value of pigment-glycol-dispersions without wetting agent, thereby permitting coarser particles still present to be removed from the dispersion by a simple and economical manner, for example, by sedimentation or centrifugation. Just this separation of coarser pigment particles raised up to now considerable difficulties because of the high viscosity of the dispersions. Pigment-containing melts of polyethylene terephthalate, prepared with the pigment-glycol dispersions of the invention, however, can be spun equally well as pigment-free melts. In the same manner the filaments obtained from this pigment-containing melt are equally good and for many purposes workable as pigment-free filaments. The period of sedimentation or centrifugation is so chosen that particles which exceed a certain admissible size (for example $3\mu$) are removed from the dispersion. The application of such separation methods is not possible without the use of the mentioned condensation products as dispersing agents in the preparation of the pigment-glycol dispersions, because of the high viscosity and the inner structure of the dispersions.

As centrifuges there are suitable high-speed separators having conical discs and operating as classifiers and discharging continuously (nozzle separators) or discontinuously the separated coarse particles. Equally well suitable are, for example, high-speed tubular centrifuges. In many cases it may be advantageous to pass the so treated pigment dispersions additionally through a cloth filter with aspiration.

This filtration causes an additional elimination of coarse particles possibly present in loose state, which, because of their low average specific gravity, have not been settled by sedimentation or centrifugation. This filtration of the dispersion too is only possible by the addition of dispersing agents reducing the viscosity. The smooth course of the filtration can, in addition, serve as evidence that the dispersion imparts to the polyester good spinning properties.

By the application of the dispersing agent as well as by the subsequent separation of coarser particles, for example, by sedimentation or centrifugation, and furthermore by the filtration following, if desired, the preceding steps of operation, there are obtained dispersions which, after the polycondensation reaction carried out by an increase of the temperature to about 240–290° C. and simultaneous reduction of the pressure to 0.1–1 mm. Hg, yield polyesters having excellent spinning and other properties and being easily workable.

If the pigment glycol dispersion, in particular that of carbon black in glycol, is to be diluted by adding dispersing agents, it turns out that a great many of such substances as are very suitable for forming fine dispersions of pigments in water, are not effective at all if used in glycol.

The most different pigments are suitable for the process of the present invention. The most advantageous results, however, are obtained if in the process of the present invention there is used carbon black in order to produce black pigmented linear polyesters.

The following example serves to illustrate the invention but it is not intended to limit it thereto:

*Example*

450 grams of gas black having a particle size of 220–280 A. are stirred into 7.0 kg. of ethylene glycol containing 35 grams of a dispersing agent consisting of a condensation product from m-cresol and the sodium salt of 2-hydroxynaphthalene-6-sulfo acid and formaldehyde and sodium sulfite. A black dispersion is formed which has practically the same viscosity as glycol. The dispersion is centrifuged in a continuous conical disc centrifuge having a speed of 8000 g (g=acceleration due to gravity) and with a period of sojourn of 30 seconds in the centrifuge, which period is sufficient for separating all the particles which are larger than 3μ. On subsequent filtration of the centrifuged dispersion through a cloth filter, no residues remain behind on the filter. The dispersion is then introduced, within 10 minutes and in an even stream, into a boiler containing a mixture of 14.5 kilograms of molten dimethylterephthalate and 6 kilograms of glycol, an even distribution of the dispersion in said mixture being effected by an efficient stirrer. After the polycondensation, carried out in usual manner at a temperature of between 260 and 285° C. under reduced pressure (0.2 to 0.5 mm. Hg), the pigmented polycondensate thereby obtained is converted into shreds and these shreds are moulded, according to the fused spinning method while using a sand filter, into filaments having 200 den. with 25 single filaments. These filaments are stretched in usual manner in a proportion of 1:4 so that the individual titre of the capillary filaments amounts to only 2 den. corresponding to a diameter of 14–16μ. It is to be noted that there arise no difficulties during the spinning of the shreds and in the processing of the deep black dyed filaments, so that these processes can practically be operated for hours and days in the same manner as with pigment-free melts and the filaments prepared therefrom.

The quantity of condensation product used as dispersing agent can be reduced in the present case, without impairing considerably the effectiveness, to about 7 grams per 7 kilograms of ethylene glycol.

Depending on the dispersing agent used and on the manner and constitution of the used lamp black or of the pigment, the amount of dispersing agency necessary for being added to the glycol varies between 0.05 and 5% by weight. In general, quantities of between 0.05 and 0.7% by weight are sufficient.

Instead of 35 grams of the heretofore mentioned condensation product from meta-cresol and the sodium salt of 2-hydroxynaphthalene-6-sulfo acid, formaldehyde and sodium sulfite, there can be used with practically the same result also 350 grams of the condensation product from β-naphthalene-sulfo acid and formaldehyde.

If the addition of the mentioned dispersing agents to the dispersion of the pigment in glycol, and the centrifugation, i.e. the separation of coarser pigment particles is omitted, the filter in the spinning head becomes clogged after only 4–6 hours of spinning. The resultant high pressure may cause failure of the spinning nozzle, interrupting the spinning process. The filaments obtained posses a number of thick spots which contain coarser lamp black particles causing breakages of the filament during the stretching and further processing, so that the material has to abandoned as non-usable.

The present invention can be applied not only to polyethylene terephthalate, but with the same good result also to polyesters in which a part of the terephthalic acid is replaced by other organic bi-functional acids of the aromatic or aliphatic series, as, for example, by isophthalic acid, sebacic acid, furthermore to polyesters in which the ethylene glycol is wholly or partially replaced by other dihydric alcohols as, for example, by 1–3 propylene glycols, 1–4 butylene glycols. In the last mentioned case the pigment is not dispersed in ethylene glycol but in the dihydric alcohol serving for the manufacture of the polyester.

We claim:

1. In a process for preparing pigmented polyesters by condensing a dihydric aliphatic alcohol containing 2 to 4 carbon atoms with a dicarboxylic acid, a part of said alcohol being mixed with up to 6 percent by weight, referred to the polyester, of a pigment to form a dispersion, the improvement which comprises preparing said dispersion of pigment and alcohol by admixing 0.05 to 5 percent by weight, referred to the alcohol, of a dispersing agent obtained by heating in an aqueous medium containing an alkali metal hydroxide a compound of the formula

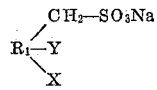

wherein X is a member selected from the group consisting of —OH and —NH$_2$, Y is a member selected from the group consisting of —H, —SO$_3$Na, and —COONa, and R$_1$ is a member selected from the group consisting of benzene and naphthalene, with a condensation product of a compound of the formula

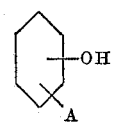

wherein A is a member selected from the group consisting of —H, —CH$_3$, —SO$_3$Na, and

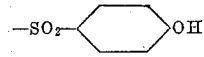

with a low molecular aliphatic aldehyde, and then separating from said dispersion particles of said pigment exceeding a size of 3μ.

2. The process as claimed in claim 1 wherein said pigment particles exceeding 3μ are separated by centrifugation.

3. The process as claimed in claim 1, wherein said pigment particles exceeding 3μ are separated by centrifugation and filtration.

4. The process as claimed in claim 1, wherein said pigment is lamp-black.

5. In a process for preparing pigmented polyesters by condensing a dihydric aliphatic alcohol containing 2 to 4 carbon atoms with a dicarboxylic acid, a part of said alcohol being mixed with up to 6 percent by weight, referred to the polyester, of a pigment to form a dispersion, the improvement which comprises preparing said dispersion of pigment and alcohol by admixing 0.05 to 5 percent by weight, referred to the alcohol, of a dispersing agent obtained by heating in an aqueous medium containing an alkali metal hydroxide a compound of the formula

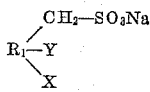

wherein X is a member selected from the group consisting of —OH and —NH$_2$, Y is a member selected from the group consisting of —H, —SO$_3$Na, and —COONa, and R$_1$ is a member selected from the group consisting of benzene and naphthalene, with a compound of the formula

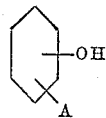

wherein A is a member selected from the group consisting of —H, —CH$_3$, SO$_3$Na, and

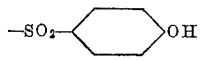

and then separating from said dispersion particles of said pigment exceeding a size of 3μ.

6. The process as claimed in claim 5, wherein said pigment particles exceeding 3μ are separated by centrifugation.

7. The process as claimed in claim 5, wherein said pigment particles exceeding 3μ are separated by centrifugation and filtration.

8. The process as claimed in claim 5, wherein said pigment is lamp-black.

9. The process as claimed in claim 7, wherein lamp black in a quantity of 1 to 10% referred to the polyethylene terephthalate is used as pigment.

10. The process as claimed in claim 7, wherein the condensation product from m-cresol and the sodium salt of the 2-hydroxy-naphthalene-6-sulfo acid, formaldehyde and sodium sulfite is used as dispersing agent.

11. In a process for preparing pigmented polyesters by condensing a dihydric aliphatic alcohol containing 2 to 4 carbon atoms with a dicarboxylic acid, a part of said alcohol being mixed with up to 6 percent by weight, referred to the polyester material, of a pigment to form a dispersion, the improvement which comprises preparing said dispersion of alcohol and pigment by admixing 0.05 to 5 percent by weight, referred to the alcohol, of a dispersing agent obtained by heating in an aqueous medium containing an alkali metal hydroxide, a compound of the formula

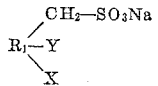

wherein X is a member selected from the group consisting of —NH$_2$ and —OH, Y is a member selected from the group consisting of —H, —SO$_3$Na, and —COONa, and R$_1$ stands for a member selected from the group consisting of benzene and naphthalene, with a compound of the formula

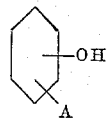

wherein A is a member selected from the group consisting of —H, —CH$_3$, —SO$_3$Na, and

and then further reacting by heating with formaldehyde and sodium sulfite, and then separating from said dispersion particles of said pigment exceeding a size of 3μ.

12. The process as claimed in claim 11, wherein said pigment particles exceeding 3μ are separated by centrifugation.

13. The process as claimed in claim 11, wherein said pigment particles exceeding 3μ are separated by centrifugation and filtration.

14. The process as claimed in claim 11, wherein said pigment is lamp-black.

15. In a process for preparing pigmented polyesters by condensing a dihydric aliphatic alcohol containing 2 to 4 carbon atoms with a dicarboxylic acid, a part of said alcohol being mixed with up to 6 percent by weight, referred to the polyester, of a pigment to form a dispersion, the improvement which comprises preparing said dispersion of alcohol and pigment by admixing 0.05 to 5 percent by weight, referred to the alcohol, of a dispersing agent obtained by heating naphthalene sulfo acid with formaldehyde in an aqueous medium, and then separating from said dispersion particles of said pigment exceeding a size of 3μ.

16. The process as claimed in claim 15, wherein said pigment particles exceeding 3μ are separated by centrifugation.

17. The process as claimed in claim 15, wherein said pigment particles exceeding 3μ are separated by centrifugation and filtration.

18. The process as claimed in claim 15, wherein said pigment is lamp-black.

References Cited in the file of this patent

UNITED STATES PATENTS

| | | |
|---|---|---|
| 2,571,319 | Waters et al. | Oct. 16, 1951 |
| 2,637,711 | Auer | May 5, 1953 |
| 2,717,214 | Marotta et al. | Sept. 6, 1955 |
| 2,857,346 | Mauthe et al. | Oct. 21, 1958 |

FOREIGN PATENTS

| | | |
|---|---|---|
| 610,137 | Great Britain | Oct. 12, 1948 |